United States Patent
Bae et al.

(10) Patent No.: US 7,760,800 B2
(45) Date of Patent: Jul. 20, 2010

(54) APPARATUS AND METHOD FOR ESTIMATING CARRIER-TO-INTERFERENCE AND NOISE RATIO IN A BROADBAND WIRELESS COMMUNICATION SYSTEM

(75) Inventors: Joon-Young Bae, Seoul (KR); Ha-Young Yang, Yongin-si (KR); Seung-Joo Maeng, Seongnam-si (KR)

(73) Assignee: Samsung Electronics Co., Ltd. (KR)

( * ) Notice: Subject to any disclaimer, the term of this patent is extended or adjusted under 35 U.S.C. 154(b) by 743 days.

(21) Appl. No.: 11/699,218

(22) Filed: Jan. 29, 2007

(65) Prior Publication Data

US 2007/0201568 A1 Aug. 30, 2007

(30) Foreign Application Priority Data

Jan. 27, 2006 (KR) .................. 10-2006-0008715

(51) Int. Cl.
*H03H 7/30* (2006.01)
(52) U.S. Cl. .................. 375/233; 375/284; 375/285
(58) Field of Classification Search .................. 375/233, 375/278, 284–285, 346, 348, 260

See application file for complete search history.

(56) References Cited

U.S. PATENT DOCUMENTS

2008/0108310 A1 * 5/2008 Tong et al. .................. 455/69

FOREIGN PATENT DOCUMENTS

| KR | 1020050074884 | 7/2005 |
| KR | 1020060001734 | 1/2006 |

* cited by examiner

*Primary Examiner*—Emmanuel Bayard
(74) *Attorney, Agent, or Firm*—The Farrell Law Firm, LLP

(57) ABSTRACT

An apparatus and method for estimating the CINR of an uplink channel in a broadband wireless communication system are provided, in which tiles being subcarrier sets are separated from a feedback signal received on the uplink channel. All symbols included in the tiles of the feedback signal are correlated with each of codewords, the absolute values of the correlations are squared for the each codeword and summed, a codeword with a maximum sum from among the codewords is selected. Received power level and noise power level are calculated using all the symbols included in the tiles of the feedback signal correlated with the codeword with the maximum sum, and the CINR of the uplink channel is estimated using the received power and the noise power levels.

21 Claims, 7 Drawing Sheets

| ORTHOGONAL VECTOR / VECTOR INDEX | SUBCARRIER MODULATION PER CODEWORD (SUBCARRIER 1, SUBCARRIER 2, ··· SUBCARRIER 8) |
| --- | --- |
| 0 | P0, P1, P2, P3, P0, P1, P2, P3 |
| 1 | P0, P3, P2, P1, P0, P3, P2, P1 |
| 2 | P0, P0, P1, P1, P2, P2, P3, P3 |
| 3 | P0, P0, P3, P3, P2, P2, P1, P1 |
| 4 | P0, P0, P0, P0, P0, P0, P0, P0 |
| 5 | P0, P2, P0, P2, P0, P2, P0, P2 |
| 6 | P0, P2, P0, P2, P2, P0, P2, P0 |
| 7 | P0, P2, P2, P0, P2, P0, P0, P2 |

FIG.3
(PRIOR ART)

APPARATUS AND METHOD FOR ESTIMATING CARRIER-TO-INTERFERENCE AND NOISE RATIO IN A BROADBAND WIRELESS COMMUNICATION SYSTEM

PRIORITY

This application claims priority under 35 U.S.C.§119 to an application filed in the Korean Intellectual Property Office on Jan. 27, 2006 and assigned Ser. No. 2006-8715, the contents of which are incorporated herein by reference.

BACKGROUND OF THE INVENTION

1. Field of the Invention

The present invention relates generally to an apparatus and method for estimating Carrier-to-Interference and Noise Ratio (CMNR) in a broadband wireless communication system. More particularly, the present invention relates to an apparatus and method for estimating the CINR of an uplink channel using an uplink fast feedback signal in a Base Station (BS) in a broadband wireless communication system. CINR represents a channel quality.

2. Description of the Related Art

In a broadband wireless communication system, a BS provides a high-speed packet data service by scheduling transmission of packet data and deciding transmission parameters for the packet data based on uplink fast feedback information representing a downlink channel quality. The BS receives uplink fast feedback signals from a plurality of Mobile Stations (MSs) and selects an MS having the best downlink channel quality from among the MSs according to the uplink fast feedback signals in each time slot. The BS then determines transmission parameters for the selected MS according to its downlink channel quality and sends packet data to the MS based on the transmission parameters. The transmission parameters include data rate, code rate, and modulation order. The uplink fast feedback information include at least one of Signal-to-Noise Ratio (SNR), Carrier-to-Interference Ratio (C/I), differential SNR of each band, fast Multiple Input Multiple Output (MIMO) feedback, and mode selection feedback.

For example, an Orthogonal Frequency Division Multiple Access (OFDMA) communication system has a physical channel designated for carrying the uplink fast feedback information. Thus, an MS sends the fast feedback information to the BS on the physical channel and the BS acquires uplink channel status information from the fast feedback channel even for a non-uplink traffic transmission period of the MS.

The fast feedback channel for carrying the fast feedback information is configured as illustrated in FIG. 1 or FIG. 2, by way of example.

FIG. 1 illustrates typical 3×3 frequency-time resources allocated for reception of fast feedback information in the BS.

Referring to FIG. 1, the feedback channel is composed of six subcarrier sets 110 called tiles and, each tile includes 3×3 subcarriers on the frequency-time domain. In each of tiles 110, eight surrounding subcarriers carry modulation symbols and one center subcarrier carries a pilot symbol.

FIG. 2 illustrates typical 4×3 frequency-time resources allocated for reception of fast feedback information in the BS.

Referring to FIG. 2, the feedback channel is composed of six subcarrier sets 210 called tiles, and each tile includes 4×3 subcarriers on the frequency-time domain. In each of tiles 210, four corner subcarriers carry pilot symbols and the other eight subcarriers carry modulation symbols.

The BS can control the power of the uplink channel by estimating its CINR using the uplink fast feedback information. Without successful uplink power control, interference becomes severe between cells. Due to the resulting degradation of link performance or unstable communication status, Quality of Service (QoS) cannot be satisfied. As a consequence, the decrease of data rate leads to the decrease of cell throughput. Accordingly, there exists a need for a method that can reliably estimate CINR in the broadband wireless communication system.

To estimate CINR of the uplink channel using the uplink fast feedback information received from the MS, the BS first calculates the soft-decision values of symbols of the uplink fast feedback information. The BS correlates the soft-decision values with each codeword, squares the absolute values of the correlations, and sums the squares. Then the BS selects a codeword with the largest sum (hereinafter, referred to as a maximum codeword) from among given codewords and detects information data bits corresponding to the codeword. Each codeword is composed of orthogonal vectors having values as illustrated in FIG. 3.

FIG. 3 illustrates typical orthogonal vectors used for modulation. Referring to FIG. 3, when the BS uses Quadrature Phase Shift Keying (QPSK), orthogonal vectors are formed using QPSK symbols, $$P0(\exp(j\frac{\pi}{4})),$$

$$P1\left(\exp\left(j\frac{3\pi}{4}\right)\right), P2\left(\exp\left(-j\frac{3\pi}{4}\right)\right), \text{ and } P3(\exp(-j\frac{\pi}{4})).$$

After detecting the maximum codeword, the BS calculates the received power level or strength and noise power level of the received signal using the squared absolute correlation values of the received signal with respect to the maximum codeword and then calculates the CINR of the received signal based on the received power and noise power levels. For example, the BS calculates the received power level by averaging the squared absolute correlation values of subcarriers included in the tiles of the received signal with respect to the maximum codeword.

Also, the BS calculates the noise power strength by calculating the difference between every adjacent two modulation symbols correlated with the maximum codeword, squaring the absolute values of the differences for all six tiles, and averaging the squares. While the noise power strength is estimated based on the differences between adjacent correlated modulation symbols, it is to be clearly understood that correlated pilot symbols can be used instead of the correlated modulation symbols in estimation of the noise power strength.

Using the received power and noise power levels, the BS calculates the CINR according to Equation (1), $$CINR = \frac{\sum_{m=1}^{number\_of\_tiles(=6)} \sum_{k=1}^{number\_of\_FF\_symbols(=8)} |Z_{m,k}|^2 - P_N}{P_N} \cdot \frac{1}{number\ of\ tiles \times number\ of\ FF\ symbols} \quad (1)$$

where number of FF symbols represents the number of fast feedback modulation symbols per tile, $Z_{m,k}$ represents the correlated received signal, and $P_N$ represents the noise power strength.

The correlated received signal is expressed as Equation (2), $$Z_{m,k} = C_{m,k} \times Y_{m,k} = H_{m,k} + C_{m,k} \times N_{m,k}, \ 1 \geq m \geq \text{number of tiles},\ 1 \geq k \geq \text{number of FF symbols} \quad \ldots (2)$$

where number of FF symbols represents the number of fast feedback modulation symbols per tile, $C_{m,k}$ represents a code symbol in a fast feedback orthogonal vector, $H_{m,k}$ represents a channel coefficient, $N_{m,k}$ represents a noise component, and $Y_{m,k}$ represents a received signal on a $k^{th}$ subcarrier in an $m^{th}$ tile, expressed as $Y_{m,k} = C_{m,k} H_{m,k} + N_{m,k}$.

The noise power strength is computed by Equation (3), $$P_N = \frac{1}{2 \times number\ of\ tiles \times (number\ of\ FF\ symbols - 1)} \sum_{m=1}^{number\_of\_tiles(=6)} \sum_{k=1}^{(number\_of\_FF\_symbols-1)(=7)} |Z_{m,k} - Z_{m,k+1}|^2 \quad (3)$$

where number of FF symbols represents the number of fast feedback modulation symbols per tile, $Z_{m,k}$ represents the correlated received signal, and $|Z_{m,k} - Z_{m,k+1}|^2$ represents the squared absolute difference between adjacent correlated modulation symbols.

As described above, the BS estimates the CINR using the uplink fast feedback information. Yet, it uses only modulation symbols or pilot symbols without fully utilizing all information of the subchannel of the MS, thereby decreasing the reliability of the CINR.

Accordingly, there is a need for a method that can increase the detection efficiency of fast feedback information and reliably estimate CINR in the BS.

SUMMARY OF THE INVENTION

An object of the present invention is to address at least the above described problems and/or disadvantages and to provide at least the advantages described below. Accordingly, an object of the present invention is to provide an apparatus and method for efficiently estimating the CINR of an uplink channel in a broadband wireless communication system.

Moreover, the present invention provides an apparatus and method for estimating the CINR of an uplink fast feedback channel by fully utilizing information of a control subchannel included in the uplink fast feedback channel in a broadband wireless communication system.

In accordance with an aspect of the present invention, there is provided a method for estimating the CINR of an uplink channel in a broadband wireless communication system, in which tiles being subcarrier sets are separated from a feedback signal received on the uplink channel. All symbols included in the tiles of the feedback signal are correlated with each of codewords; the absolute values of the correlations are squared for each codeword and summed, a codeword with a maximum sum from among the codewords is selected. Received power and noise power strengths are calculated using all the symbols included in the tiles of the feedback signal correlated with the codeword with the maximum sum, and the CINR of the uplink channel is estimated using the received power and the noise power levels.

In accordance with another aspect of the present invention, there is provided an apparatus for estimating the CINR of an uplink channel in a broadband wireless communication system, in which a correlation calculator correlates all symbols included in a feedback signal received on a subchannel of the uplink channel with each of codewords and squares the absolute values of the correlations for each codeword. A detector sums the squared absolute correlations for each codeword and detects the feedback signal using a codeword with a maximum sum selected from among the codewords; and a CINR estimator estimates the CINR based on received power and noise power calculated using all the symbols included in the feedback signal correlated with the codeword with the maximum sum.

BRIEF DESCRIPTION OF THE DRAWINGS

The above and other objects, features and advantages of the present invention will be more apparent from the following detailed description taken in conjunction with the accompanying drawings, in which:

FIG. 3 illustrates typical orthogonal vectors used for modulation;

DETAILED DESCRIPTION OF THE PREFERRED EMBODIMENTS

The matters defined in the description such as a detailed construction and elements are provided to assist in a comprehensive understanding of embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The present invention provides a technique for estimating CINR by fully utilizing the information of a control subchannel included in an uplink fast feedback channel in a broadband wireless communication system. While the present invention is described in the context of an OFDMA broadband wireless communication system, it is to be appreciated that the present invention is also applicable to other multiple access schemes.

In broadband wireless communication system, noise projection method, correlation method, or the like, are used for CINR estimation. Herein, the CINR estimation is carried out by the noise projection method by way of example.

Figure 4:
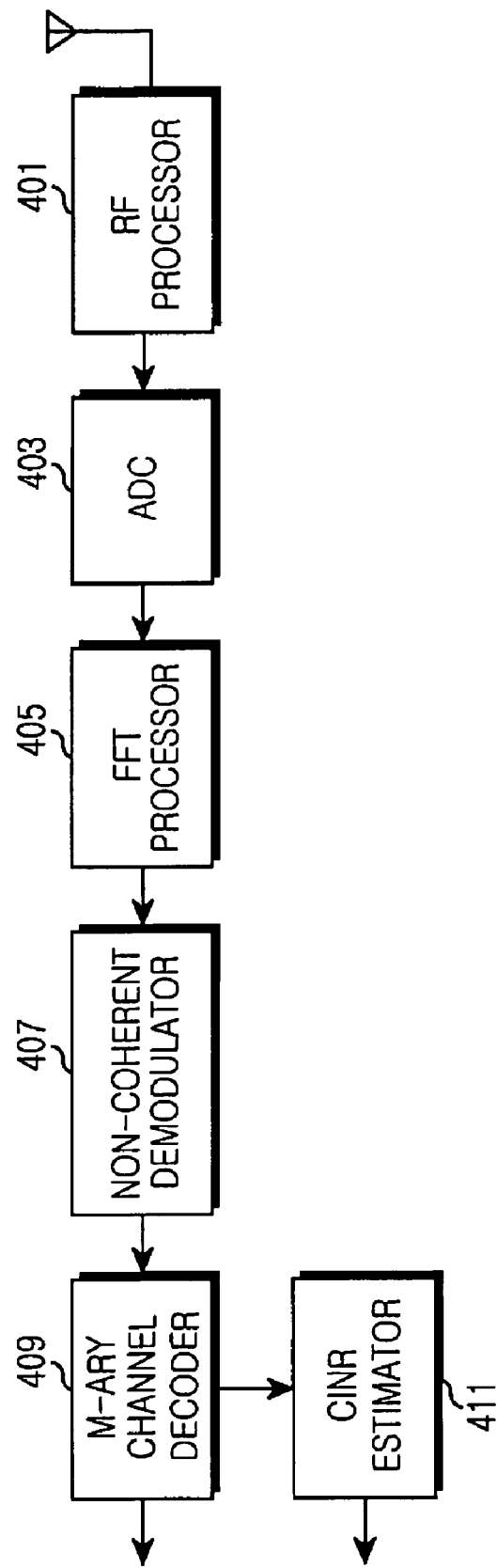
FIG. 4 is a block diagram of the BS for receiving uplink fast feedback information according to the present invention.

Referring to FIG. 4, the BS includes a Radio Frequency (RF) processor 401, an Analog-to-Digital Converter (ADC) 403, a Fast Fourier Transform (FFT) processor 405, a non-coherent demodulator 407, a channel decoder 409, and a CINR estimator 411.

RF processor 401 receives an uplink fast feedback signal from an MS through an antenna and downconverts the RF signal to a baseband signal. ADC 403 converts the analog signal received from RF processor 401 to a digital signal.

FFT processor 405 converts the time sample data received from ADC 403 to frequency data by FFT. Non-coherent demodulator 407 calculates soft-decision values of symbols received from FFT processor 405.

Channel decoder 409 determines the reliability of the received uplink fast feedback information based on the soft-decision values. If it is determined that the uplink fast feedback information is reliable, channel decoder 409 decodes the soft-decision values at a predetermined coding rate and detects data by determining a codeword corresponding to the soft-decision values.

CINR estimator 411 estimates the received power and noise power levels of the uplink fast feedback channel using the codeword and estimates the CINR of the uplink channel based on the estimated received power and noise power levels.

Figure 5:
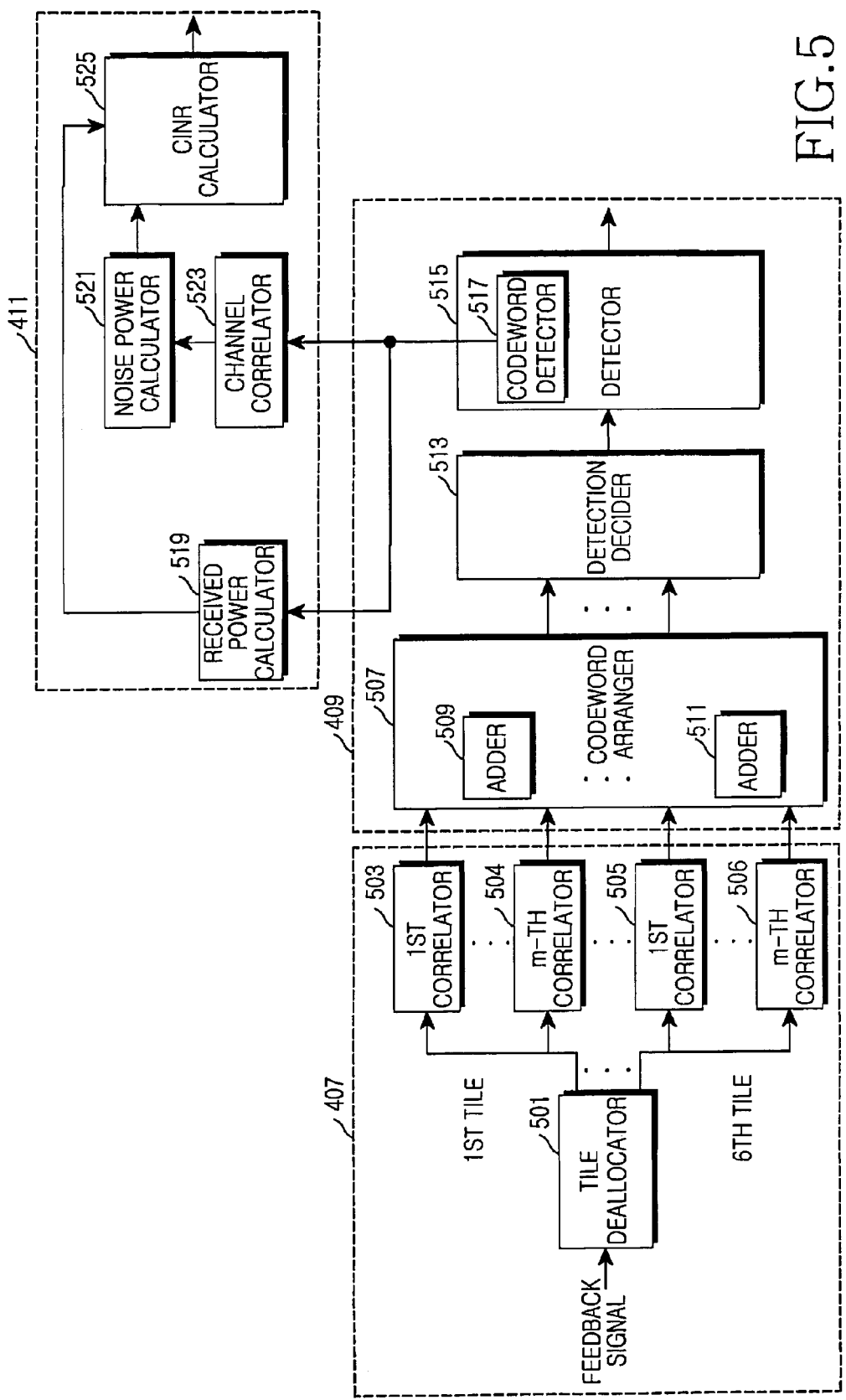
FIG. 5 is a detailed block diagram of a non-coherent demodulator, a channel decoder, and a CINR estimator illustrated in FIG. 4.

The above-described BS receiver illustrated in FIG. 4 has the detailed structure illustrated in FIG. 5, for CINR estimation.

Figure 1:
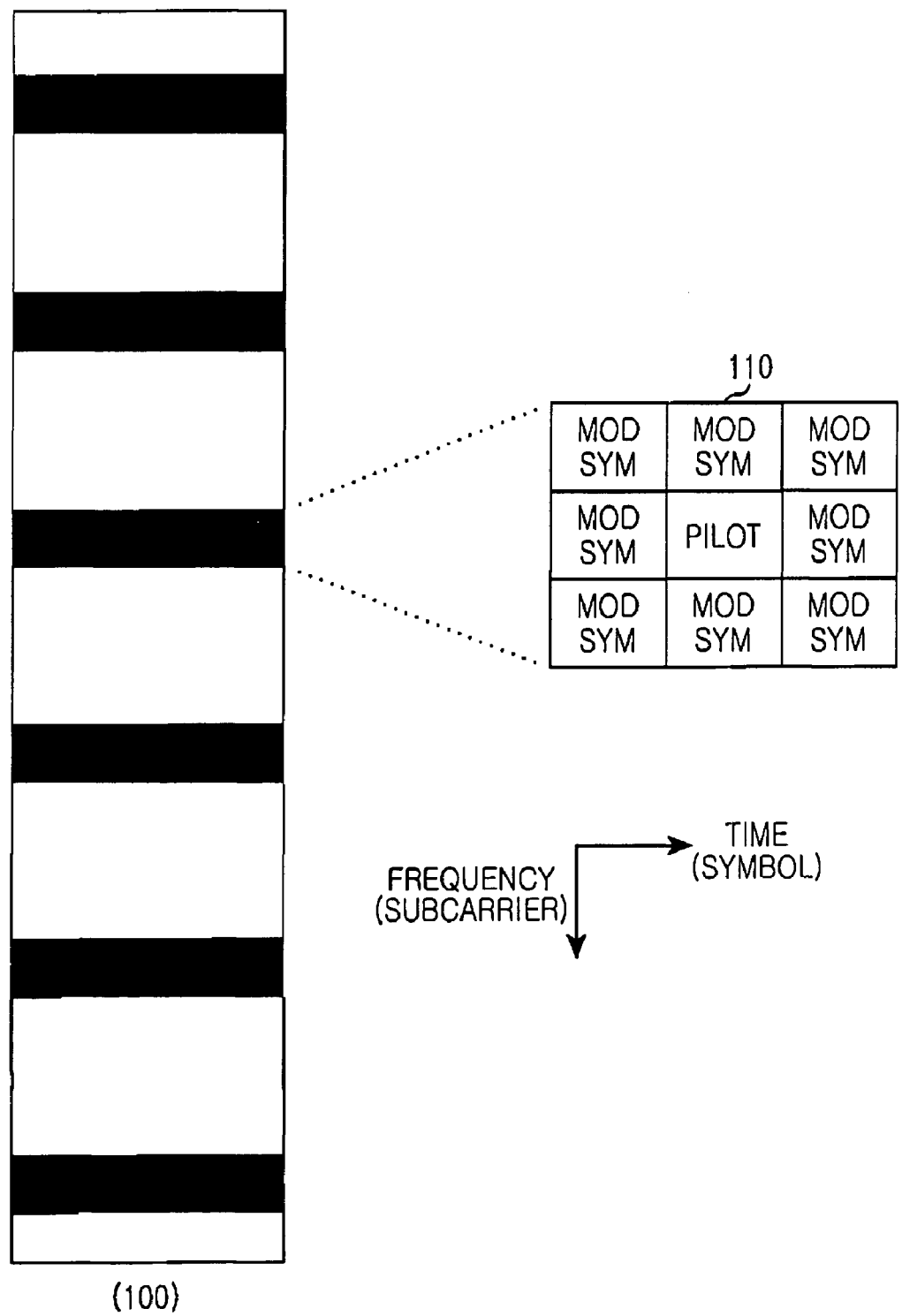
FIG. 1 illustrates typical 3×3 frequency-time resources allocated for reception of fast feedback information in a BS.
Figure 2:
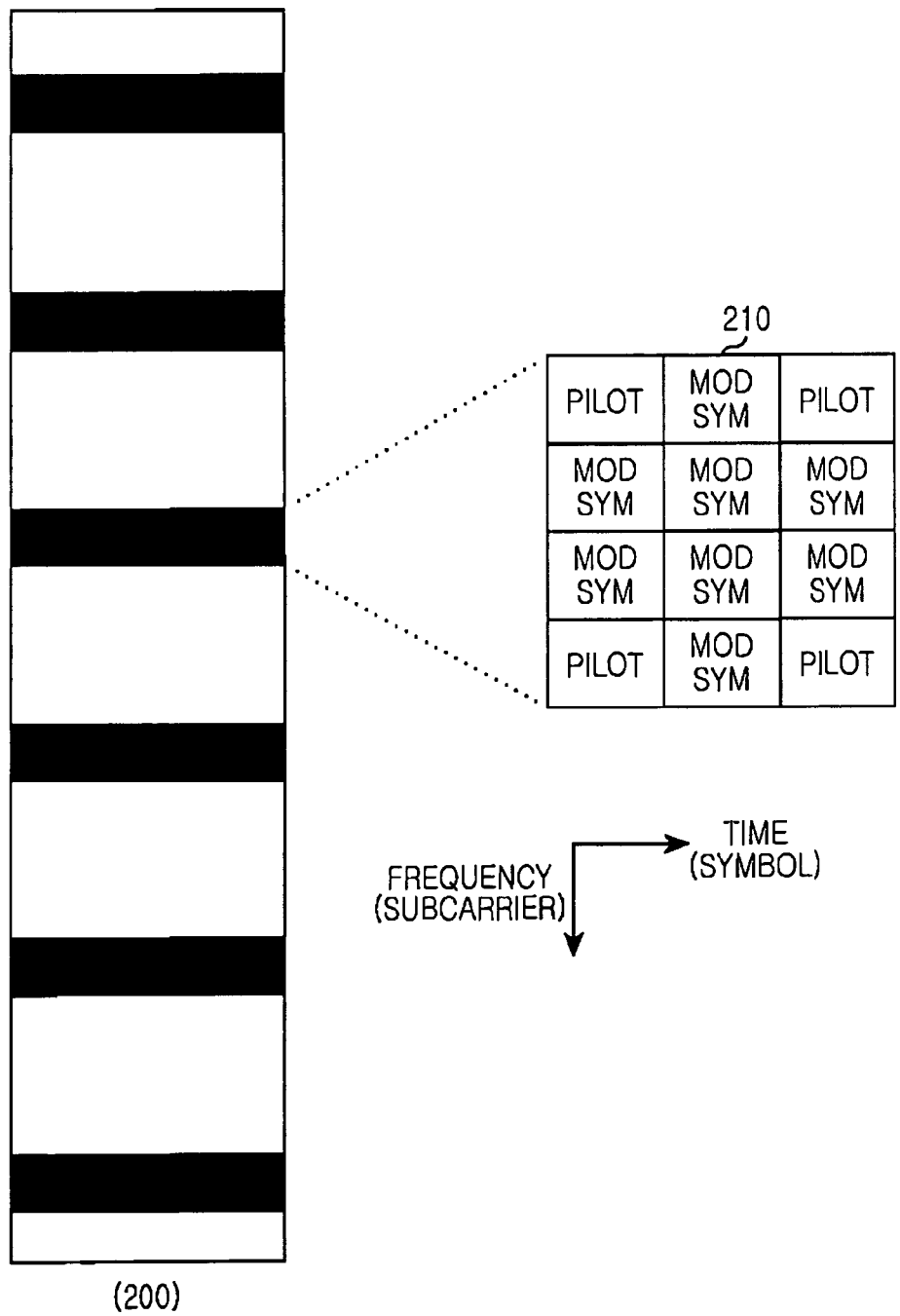
FIG. 2 illustrates typical 4×3 frequency-time resources allocated for reception of fast feedback information in the BS.

FIG. 5 is a detailed block diagram of non-coherent demodulator 407, channel decoder 409, and CINR estimator 411. The following description will be made on the assumption that the uplink fast feedback channel is comprised of subcarrier sets, i.e. tiles each having 4×3 subcarriers in the frequency-time domain as illustrated in FIG. 2.

Referring to FIG. 5, non-coherent demodulator 407 includes a tile de-allocator 501 and correlators 503 to 506. Channel decoder 409 includes a codeword arranger 507, a detection decider 513, and a detector 515. CINR estimator 411 includes a received power calculator 519, a noise power calculator 521, a channel correlator 523, and a CINR calculator 525.

In non-coherent demodulator 407, tile de-allocator 501 separates six tiles each having 4×3 subcarriers from FFT symbols received from FFT processor 405 illustrated in FIG. 4. Correlators 503 to 506 correlate the subcarriers of the tiles with each codeword and squares the absolute values of the correlations. The number of the correlators 503 to 506 is equal to the product of the number of tiles and the number of subcarriers per tile (i.e. eight modulation symbols and four pilot symbols).

In channel decoder 409, codeword arranger 507, which include adders 509 to 511, sums the squared absolute correlation values of the subcarriers received from correlators 503 to 506 for each codeword, and averages the sums calculated for all codewords.

Detection decider 513 calculates the difference between the highest sum (MAX) and the average of the sums (AVG) and decides as to whether to detect the uplink fast feedback information by comparing the MAX−AVG difference with a predetermined threshold (Th).

For example, if the MAX−AVG difference is equal to or higher than the threshold ((MAX−AVG)≧Th), detection decider 513 determines that the information data of the codeword having MAX (referred to as maximum codeword) is reliable. Detector 515 detects the codeword corresponding to the uplink fast feedback information through a codeword detector 517 and provides the codeword to channel correlator 523 and received power calculator 519.

If the MAX−AVG difference is less than the threshold ((MAX−AVG)<Th), detector 515 does not detect the uplink fast feedback signal, considering the reception environment of the uplink fast feedback signal is poor.

In CINR estimator 411, received power calculator 519 calculates the received power level of the received signal by averaging the squared absolute correlation values of the modulation symbols and pilot symbols included in the six tiles of the received signal, which have been calculated with respect to the maximum codeword.

Channel correlator 523 calculates the difference between every adjacent two symbols in the six tiles of the received signal correlated with the maximum codeword. In other words, channel correlator 523 correlates every two adjacent correlated symbols with each other, inclusive of modulation symbols and pilot symbols, for example, in the manner illustrated in FIGS. 6A and 6B.

Figure 6A:
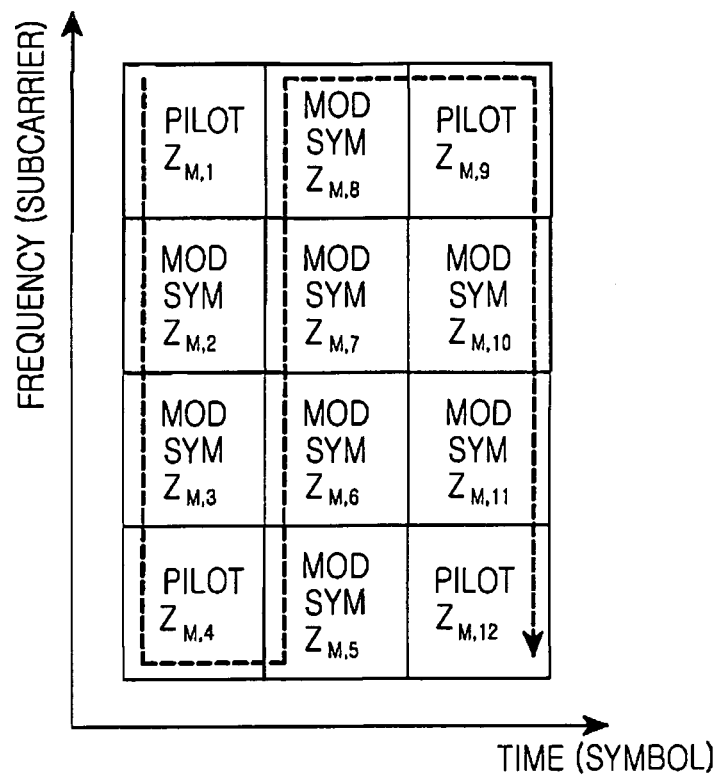
FIGS. 6A and 6B illustrate how to calculate differences between every adjacent two correlated symbols to estimate noise power strength according to the present invention.
Figure 6B:
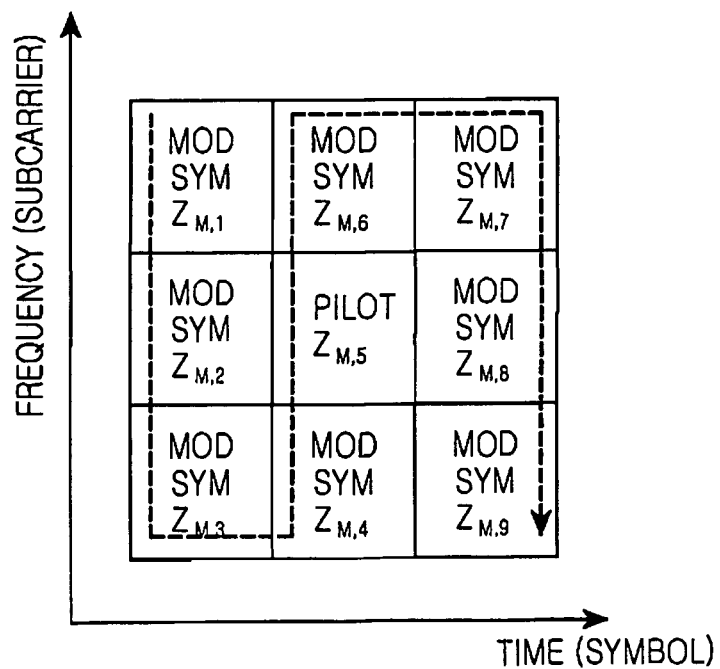

Referring to FIGS. 6A and 6B, channel correlator 523 sequentially calculates the difference between every adjacent two symbols of the uplink fast feedback signal correlated with the maximum codeword. In FIG. 6A, channel correlator 523 sequentially correlates between every adjacent two correlated symbols in a subcarrier set including 4×3 subcarriers. In FIG. 6B, channel correlator 523 sequentially correlates between every adjacent two correlated symbols in a subcarrier set including 3×3 subcarriers.

Noise power calculator 521 squares the absolute values of the differences for the six tiles and averages the squared absolute difference values, thereby calculating the noise power of the received signal.

CINR calculator 525 calculates the CINR of the received signal using the received power and the noise power levels according to Equation (4), $$CINR = \frac{\sum_{m=1}^{\text{number of tiles}(=6)} \sum_{k=1}^{\binom{\text{number of FF symbols+}}{\text{number of pilot symbols}}(=12)} |Z_{m,k}|^2 - P_N}{\frac{1}{\text{number of tiles} \times \binom{\text{number of FF symbols+}}{\text{number of pilot symbols}}} P_N} \qquad (4)$$

where number of FF symbols represents the number of fast feedback modulation symbols per tile, $Z_{m,k}$ represents the correlated received signal, and $P_N$ represents the noise power.

The correlated received signal is expressed as Equation (5), $$Z_{m,k} = C_{m,k} \times Y_{m,k} = H_{m,k} + C_{m,k} \times N_{m,k}, \; 1 \leq m \leq \text{number of tiles}, \; 1 \leq k \leq (\text{number of FF symbols+number of pilot symbols}) \qquad (5)$$

where $C_{m,k}$ represents a code symbol in a fast feedback orthogonal vector or a pilot symbol, $H_{m,k}$ represents a channel coefficient, $N_{m,k}$ represents a noise component, and $Y_{m,k}$ represents a received signal on a $k^{th}$ subcarrier in an $m^{th}$ tile, expressed as $Y_{m,k} = C_{m,k} H_{m,k} + N_{m,k}$.

The noise power is computed by Equation (6), $$P_N = \frac{1}{2 \times \text{number of tiles} \times \begin{pmatrix} \text{number of FF symbols} + \\ \text{number of pilot symbols} - 1 \end{pmatrix}} \sum_{m=1}^{\text{number of tiles}(=6)} \sum_{k=1}^{\begin{pmatrix} \text{number of FF symbols} + \\ \text{number of pilot symbols} - 1 \end{pmatrix}(=11)} |Z_{m,k} - Z_{m,k+1}|^2$$

where number of FF symbols represents the number of fast feedback modulation symbols per tile, $Z_{m,k}$ represents the correlated received signal, and $|Z_{m,k} - Z_{m,k+1}|^2$ represents the squared absolute difference between two adjacent symbols in the correlated received signal.

Figure 7:
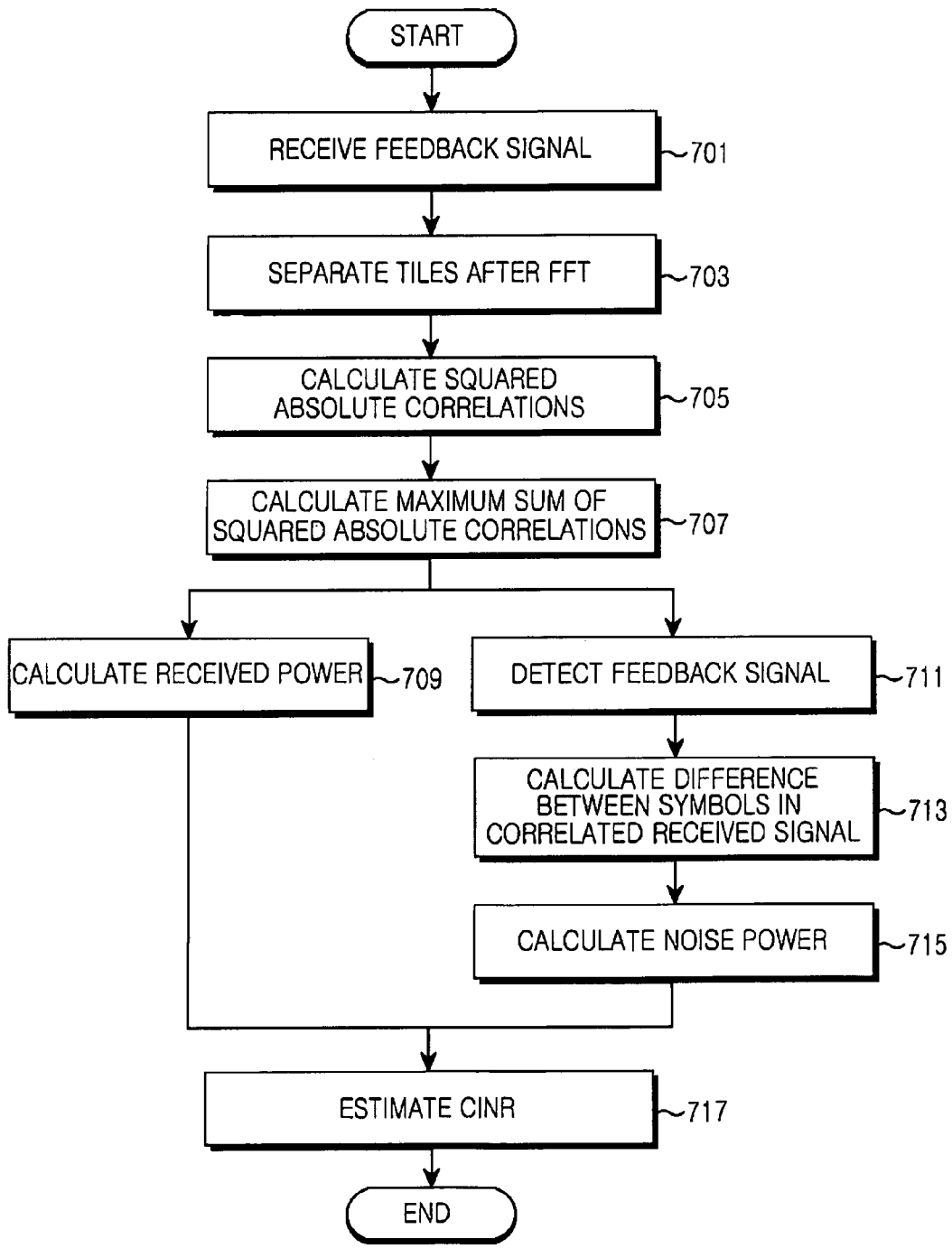
FIG. 7 is a flowchart for estimating CINR using uplink fast feedback information according to the present invention.

Referring to FIG. 7, the BS monitors reception of an uplink fast feedback signal from an MS within its service area in step 701. Upon receipt of the uplink fast feedback signal, the BS FFT processes the received signal and separates the FFT signals into tiles in step 703. For example, the BS separates six tiles of the uplink fast feedback channel from the FFT signals as illustrated in FIG. 2.

In step 705, the BS calculates the squared absolute correlation values of modulation symbols on eight subcarriers and pilot symbols on four subcarriers in each of the tiles with respect to each codeword. Specifically, the correlation is the process of correlating each tile having 4×3 subcarriers carrying eight modulation symbols and four pilot symbols with 4×3 symbols including the symbols of an orthogonal vector corresponding to the tile in each codeword and pilot transmission symbols.

For each codeword, the BS sums the squared absolute correlation values of the six tiles and checks the maximum (MAX) of the sums for all codewords in step 707.

In step 709, the BS estimates the total power of the received signal by averaging the squared absolute correlation values of the received signal that have been calculated with respect to a codeword with the maximum sum, i.e. a maximum codeword.

In the mean time, the BS detects the uplink fast feedback signal to calculate its noise power level in step 711. Whether to perform the detection is decided by comparing the difference between the maximum of the sums (MAX) and the average of the sums (AVG) with a predetermined threshold (Th). If the MAX−AVG difference is equal to or larger than the threshold ((MAX_AVG)≧Th), the uplink fast feedback signal is detected, considering that information data corresponding to the maximum codeword is reliable.

In step 713, the BS calculates the difference between every adjacent two symbols in the received signal correlated with the maximum codeword and squares the absolute values of the differences. That is, the BS correlates between every adjacent two symbols in the correlated received signal.

The BS then averages the squared absolute differences for the six tiles, thereby calculating the noise power in step 715 and estimates the uplink CINR based on the total received power and the noise power in step 717. The BS ends the procedure.

In the case where the uplink fast feedback channel is configured in tiles each having 4×3 subcarriers, the uplink CINR is estimated using all of eight available orthogonal vectors and four pilot symbols, as described above. In the case where the uplink fast feedback channel is configured in tiles each having 3×3 subcarriers, the uplink CINR can be estimated using eight available orthogonal vectors and one pilot symbol.

While the difference between every adjacent two symbols in the correlated received signal is calculated sequentially in the order shown in FIGS. 6A and 6B in the above description, this operation can be performed in any other manner.

As is apparent from the above description, since CINR is estimated by utilizing all of the modulation symbols and pilot symbols of a control subchannel signal on an uplink fast feedback channel in a broadband wireless communication system according to the present invention, the processing time to calculate total received power is increased, channel information is accurately delivered, and system operation is stabilized. In addition, the present invention is applicable to any subchannel configuration irrespective of a tile structure or a CINR estimation scheme. Therefore, the system can be operated flexibly.

While the invention has been shown and described with reference to certain preferred embodiments thereof, it will be understood by those skilled in the art that various changes in form and details may be made therein without departing from the spirit and scope of the invention as further defined by the appended claims.

What is claimed is:

1. A method for estimating a Carrier-to-Interference and Noise Ratio (CINR) of an uplink channel by a Base Station (BS) in a wireless communication system, comprising:
   separating, by the BS, tiles that are subcarrier sets from a feedback signal received on the uplink channel;
   correlating, by the BS, all symbols included in the tiles of the feedback signal with each of codewords, squaring the absolute values of the correlations for the each codeword, summing the squared absolute correlations for the each codeword, and selecting a codeword with a maximum sum from among the codewords;
   calculating, by the BS, received power and noise power using all the symbols included in the tiles of the feedback signal correlated with the codeword with the maximum sum; and
   estimating, by the BS, the CINR of the uplink channel using the received power and the noise power.

2. The method of claim 1, wherein the tile separation comprises:
   monitoring reception of the feedback signal on the uplink channel;
   performing Fast Fourier Transform (FFT)-processing on the feedback signal, upon receipt of the feedback signal on the uplink channel; and
   separating FFT signals into the tiles.

3. The method of claim 1, wherein all the symbols of the tiles comprise a modulation symbol and a pilot symbol.

4. The method of claim 1, wherein the selection of a codeword with a maximum sum comprises:
   comparing the sums of the squared absolute correlations of all the symbols included in the tiles of the feedback signal calculated with respect to all of the codewords; and
   selecting the codeword with the maximum sum from among the codewords.

5. The method of claim 1, wherein the received power calculation comprises:
   checking the squared absolute correlations of all the symbols included in the tiles of the feedback signal calculated with respect to the codeword with the maximum sum; and calculating the received power by averaging the checked squared absolute correlations.

6. The method of claim 1, wherein the noise power calculation comprises:
calculating differences among the correlations of all the symbols in the tiles of the feedback signal correlated with the codeword with the maximum sum;
calculating squared absolute values of the differences; and
calculating the noise power by averaging the squared absolute difference values.

7. The method of claim 6, further comprising determining, by the BS whether to perform detection on the feedback signal using the codeword with the maximum sum, wherein if it is determined to detect the feedback signal, the difference calculation is performed.

8. The method of claim 6, wherein the difference calculation comprises sequentially calculating the difference between the correlations of every adjacent two symbols in the tiles of the feedback signal, calculated with respect to the codeword with the maximum sum.

9. The method of claim 6, wherein the difference calculation comprises:
performing the correlation between the sequentially adjacent symbols in the first period divided by time resource;
performing the correlation between the last symbol of the first period and the first symbol of the second period; and
performing the correlation between the sequentially adjacent symbols in the second period.

10. The method of claim 1, wherein the CINR estimation comprises calculating the CINR by $$CINR = \frac{\frac{1}{\text{number of tiles} \times \begin{pmatrix} \text{number of } FF \text{ symbols} + \\ \text{number of pilot symbols} \end{pmatrix}} \sum_{m=1}^{\text{number of tiles}} \sum_{k=1}^{\begin{pmatrix} \text{number of } FF \text{ symbols} + \\ \text{number of pilot symbols} \end{pmatrix}} |Z_{m,k}|^2 - P_N}{P_N}$$

where number of FF symbols represents the number of fast feedback modulation symbols per tile, number of pilot symbols represents the number of pilot symbols per tile, $Z_{m,k}$ represents the feedback signal correlated with the codeword with the maximum sum, and $P_N$ represents the noise power.

11. An apparatus for estimating the Carrier-to-Interference and Noise Ratio (CINR) of an uplink channel in a wireless communication system, comprising:
a correlation calculator for correlating all symbols included in a feedback signal received on a subchannel of the uplink channel with each of codewords and squaring the absolute values of the correlations for the each codeword;
a detector for summing the squared absolute correlations for the each codeword and detecting the feedback signal using a codeword with a maximum sum selected from among the codewords; and
a CINR estimator for estimating the CINR based on received power and noise power calculated using all the symbols included in the feedback signal correlated with the codeword with the maximum sum.

12. The apparatus of claim 11, wherein all the symbols of the tiles comprise a modulation symbol and a pilot symbol.

13. The apparatus of claim 11, wherein the correlation calculator comprises:
a separator for separating tiles being subcarrier sets from the feedback signal;
a correlator for correlating all the symbols included in the tiles of the feedback signal with the each codeword; and
a squarer for squaring the absolute values of the correlations for the each codeword.

14. The apparatus of claim 11, wherein the CINR estimator comprises:
a received power calculator for estimating the received power using the squared absolute correlations of all the symbols included in the feedback signal calculated with respect to the codeword with the maximum sum;
a noise power estimator for estimating the noise power using squared absolute differences among the correlations of all the symbols included in the feedback signal, calculated with respect to the codeword with the maximum sum; and
a CINR calculator for calculating the CINR using the received power and the noise power.

15. The apparatus of claim 14, wherein the received power calculator calculates the received power by averaging the squared absolute correlations of all the symbols included in the feedback signal calculated with respect to the codeword with the maximum sum.

16. The apparatus of claim 14, wherein the noise power estimator comprises:
a codeword detector for detecting the codeword with the maximum sum;
a channel correlator for calculating the differences among the correlations of all the symbols included in the feedback signal calculated with respect to the codeword with the maximum sum; and
a noise power calculator for squaring the absolute values of the differences and calculating the noise power by averaging the squared absolute difference values.

17. The apparatus of claim 14, wherein the channel correlator sequentially calculates the difference between the correlations of every adjacent two symbols in the feedback signal calculated with respect to the codeword with the maximum sum.

18. The apparatus of claim 14, wherein the CINR calculator calculates the CINR by $$CINR = \frac{\frac{1}{\text{number of tiles} \times \begin{pmatrix} \text{number of } FF \text{ symbols} + \\ \text{number of pilot symbols} \end{pmatrix}} \sum_{m=1}^{\text{number of tiles}} \sum_{k=1}^{\begin{pmatrix} \text{number of } FF \text{ symbols} + \\ \text{number of pilot symbols} \end{pmatrix}} |Z_{m,k}|^2 - P_N}{P_N}$$

where number of FF symbols represents the number of fast feedback modulation symbols per tile, number of pilot symbols represents the number of pilot symbols per tile, $Z_{m,k}$ represents the feedback signal correlated with the codeword with the maximum sum, and $P_N$ represents the noise power.

19. A method for estimating a channel quality of an uplink channel by a Base Station (BS) in a wireless communication system, comprising:

separating, by the BS, tiles that are subcarrier sets from a feedback signal received on the uplink channel;

correlating, by the BS, all symbols included in the tiles of the feedback signal with each of codewords, squaring the absolute values of the correlations for the each codeword, summing the squared absolute correlations for the each codeword, and selecting a codeword with a maximum sum from among the codewords;

calculating, by the BS, received power and noise power using all the symbols included in the tiles of the feedback signal correlated with the codeword with the maximum sum; and estimating, by the BS, a channel quality of the uplink channel using the received power and the noise power.

20. An apparatus for estimating a channel quality of an uplink channel in a broadband wireless communication system, comprising:

a correlation calculator for correlating all symbols included in a feedback signal received on a subchannel of the uplink channel with each of codewords and squaring the absolute values of the correlations for the each codeword;

a detector for summing the squared absolute correlations for the each codeword and detecting the feedback signal using a codeword with a maximum sum selected from among the codewords; and a channel quality estimator for estimating a channel quality based on received power and noise power calculated using all the symbols included in the feedback signal correlated with the codeword with the maximum sum.

21. A wireless communication system for estimating a channel quality of an uplink channel, comprising:

means for separating tiles being subcarrier sets from a feedback signal received on the uplink channel;

means for correlating all symbols included in the tiles of the feedback signal with each of codewords, squaring the absolute values of the correlations for the each codeword, summing the squared absolute correlations for the each codeword, and selecting a codeword with a maximum sum from among the codewords;

means for calculating received power and noise power using all the symbols included in the tiles of the feedback signal correlated with the codeword with the maximum sum; and means for estimating a channel quality of the uplink channel using the received power and the noise power.

* * * * *